(12) United States Patent
Harvest

(10) Patent No.: US 6,483,278 B2
(45) Date of Patent: Nov. 19, 2002

(54) METHOD AND POWER SUPPLY DEVICE FOR GENERATING REGULATED D.C. VOLTAGE FROM A.C. VOLTAGE

(75) Inventor: Nils-Ole Harvest, Nordborg (DK)

(73) Assignee: Danfoss Compressors GmbH, Flensburg (DE)

( * ) Notice: Subject to any disclaimer, the term of this patent is extended or adjusted under 35 U.S.C. 154(b) by 0 days.

(21) Appl. No.: 09/943,256

(22) Filed: Aug. 30, 2001

(65) Prior Publication Data

US 2002/0031001 A1 Mar. 14, 2002

Related U.S. Application Data

(63) Continuation of application No. PCT/DK00/00058, filed on Feb. 14, 2000.

(30) Foreign Application Priority Data

Mar. 4, 1999 (GB) .................................... 199 09464

(51) Int. Cl.$^7$ ................................................ G05F 1/613
(52) U.S. Cl. ................................. 323/224; 323/287
(58) Field of Search .............................. 323/224, 282, 323/286, 287, 271, 284; 363/80, 89

(56) References Cited

U.S. PATENT DOCUMENTS 4,943,762 A * 7/1990 Campbell et al. ........... 323/284
4,947,309 A * 8/1990 Jonsson ....................... 363/17
4,964,029 A 10/1990 Severinsky et al.
5,235,504 A 8/1993 Sood

FOREIGN PATENT DOCUMENTS

DE 36 08 082 9/1987
EP 0 779 700 6/1997

* cited by examiner

Primary Examiner—Shawn Riley
(74) Attorney, Agent, or Firm—Altera Law Group, LLC

(57) ABSTRACT

A method and power supply device for generating a regulated direct voltage from an alternating voltage using a step-down transformer, a step-up transformer, an inductance coil and a control device that controls the transformer in a step-down or step-up transformation mode is disclosed herein. An inductance coil voltage measuring signal is compared with three limiting values (A, B, C), wherein A corresponds to zero, B lies between A and C and B and C correspond to the direct voltage. Switching from the step-down to the step-up transformation mode is effected when the increasing voltage measuring signal drops after reaching B and A is not reached again and increases to C instead. Switching from step-down to step-up transformation mode is effected when the decreasing voltage measuring signal increases after reaching A and B is not reached and drops to A instead. In the power supply device, the control device includes three comparators for comparing the limiting values (A, B, C) with the voltage measuring signal of a voltage measuring device, wherein at least B anc C are dependent upon regulation deviation.

7 Claims, 2 Drawing Sheets

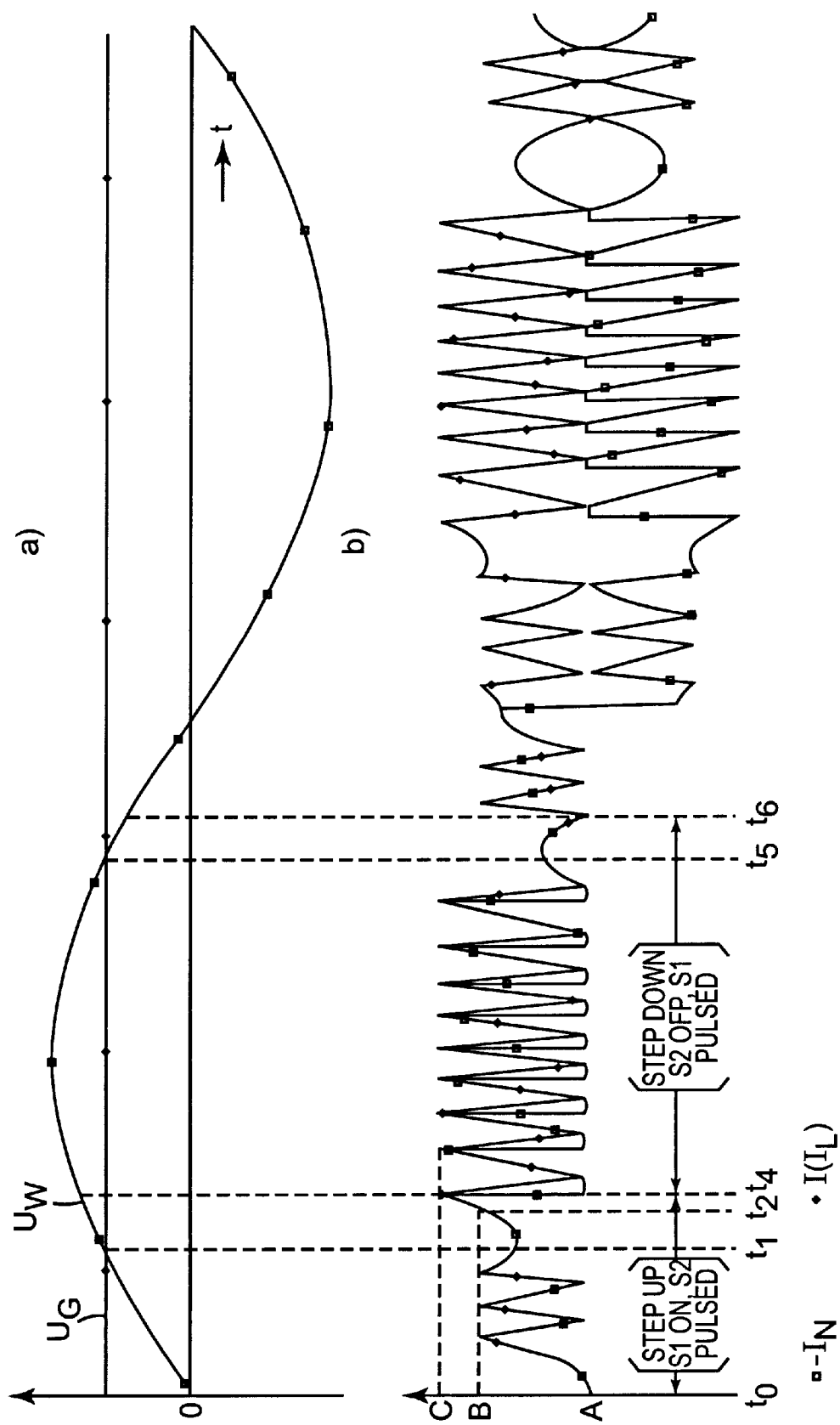

METHOD AND POWER SUPPLY DEVICE FOR GENERATING REGULATED D.C. VOLTAGE FROM A.C. VOLTAGE

This application is a continuation of PCT/DK00/00058, filed Feb. 14, 2000.

BACKGROUND OF THE INVENTION

1. Field of the Invention

The invention relates to a method according to the preamble of the patent claim 1 and a power supply device for implementing said method according to the preamble of the patent claim 3.

2. Description of the Related Art

A power supply device working according to this method is known from the U.S. Pat. No. 5,235,504. It comprises a large number of comparators, comparing, among other things, measuring values of the input current on the alternating current side of the power supply device with constant reference values and also comparing the output voltage of the rectifier with a constant reference value. Depending on the rectifier output voltage, the frequency of an oscillator is regulated, and in dependence of the output frequency of the oscillator and the output signals of the comparators, the switching frequency of the switch is regulated. The design of this power supply device is expensive.

From the European patent application 0 779 700 A2 a similar power supply device is known, which also has a large number of comparators, and in which the load current is measured and regulated in accordance with a predetermined, sine-like curve course. The activation of the switches happens in dependence of varying measuring magnitudes exceeding a limit value, including the load current. However, the switches are activated so that during the switching processes the current does not drop to zero. Through the inductor arranged on the direct current side, a relatively high average current flows, so that the inductor converts a relatively high power loss and has to be dimensioned accordingly large. Additionally, when switching on the switches (closing or putting into the conducting state, respectively), the diodes are conducting in the reverse direction for a short period due to the high average value of the current during the reverse recovery time of the diodes, which causes an even higher power loss. As the resulting, approximately needle-shaped current impulse flowing in the blocking direction has steep flanks, it additionally causes interfering signals in the radio frequency area.

An important objective of the known power supply devices described is a power factor correction with the purpose of obtaining a high efficiency. Thus, with the power supply device according to EP 0 779 700 A2, a relatively high power factor of 0.97 is obtained. It also conforms to the maximum limits of the harmonics and their amplitudes in the mains current prescribed in the international standard IEC 1000-3-2, 1995-03, however, a power supply device of this kind is expensive, and therefore is a cost-burden when used in devices, which are produced in series in large numbers, for example in speed regulated domestic compressors, even though they will do with only one inductor, in which the step-up converter and the step-down converter execute time sharing, as the regulation with only one inductor is too complicated, as opposed to mains devices, in which each converter has its own inductor.

SUMMARY OF THE INVENTION

The invention is based on the task of providing a method and a power supply device as mentioned in the introduction, whose implementation and the design, respectively, is more simple, though still meeting the standard 1000-3-2.

This solution is realised with only three comparators and without an oscillator for the regulation of the switching frequency of the switches. The limit values change in dependence of the output signal of the power supply device, for example, the speed of a motor functioning as the load, which speed is again a measure of the direct output voltage, whereas the switching times of the switches change in dependence of the load current, both the change of the limit values and that of the measured current signal causing a balancing of changes of the control parameter (D.C. voltage) by means of the control circuit of the controller.

The method can be realised in such a way that the first switch is on in the step-up conversion mode, and during this mode the second switch is turned off, when the rising measured current signal reaches the second limit value, and is turned on, when the decreasing measured current signal reaches the first limit value, and that in the step-down conversion mode the second switch is turned off, and during this mode the first switch is turned on, when the decreasing measured current signal reaches the first limit value and is turned off, when the rising measured current signal reaches the third limit value.

Preferably, it is ensured that the second and the third limit values are directly proportional to the output signal of the adder. This causes a quick balancing of regulation deviations or regulation differences, respectively.

The limit values can be picked up at a voltage divider, which is connected with the output of the adder via an amplifier. In a simple manner, the voltage divider causes the desired proportionality between the limit values and the output signal of the adder.

The switches can be immediately connected in series. This permits the use of an integrated circuit component, in which the switches are realised as semiconductor switches, and where separate cabling for the connection of an inductor arranged between the switches, as known per se, is avoided. In this connection, the integrated circuit component can be made in IGBT technique (IGBT=Insulated Gate Bipolar Transistor), and preferably also be designed as a traditional circuit component, which is used for the inverter of a motor controller operated by the D.C. voltage, that is, instead of discrete semi-conductor switches, traditional series-produced and accordingly non-expensive IGBTs can be used.

Due to the fact that the first limit value is close to zero, the load current drops in practically each switching period to zero or close to zero, so that during the switching periods the average direct current value is relatively low and correspondingly the inductor can be dimensioned smaller. At the same time, the peaks of the current in the blocking direction of the diodes, and thus the power loss of the inductor as well as the interfering signals in the radio frequency area are further reduced.

Preferably, it is further ensured that the control device comprises a switching frequency limiter, which delays the switching-on time of the switches, if a minimum time has not lapsed since the latest switching-on time, and hereby preventing dropping below a minimum switching period duration, or which advances the switching-on time of the switches, if a maximum time has lapsed since the latest switching-on time of the switches, hereby preventing an exceeding of a maximum switching period duration. In this way, the switching frequencies of the switches are limited upwards and downwards, and their switching period durations are limited downwards and upwards, respectively. Otherwise, a too high switching frequency would cause too high switching losses of the switches, as the switching losses are proportional to the switching frequency. On the other hand, a too low switching frequency, or a too long switching period duration, respectively, would cause a too high load on the inductor.

BRIEF DESCRIPTION OF THE DRAWINGS

In the following, the invention is described in detail on the basis of the enclosed drawings, showing.

DETAILED DESCRIPTION OF THE INVENTION

Figure 1:
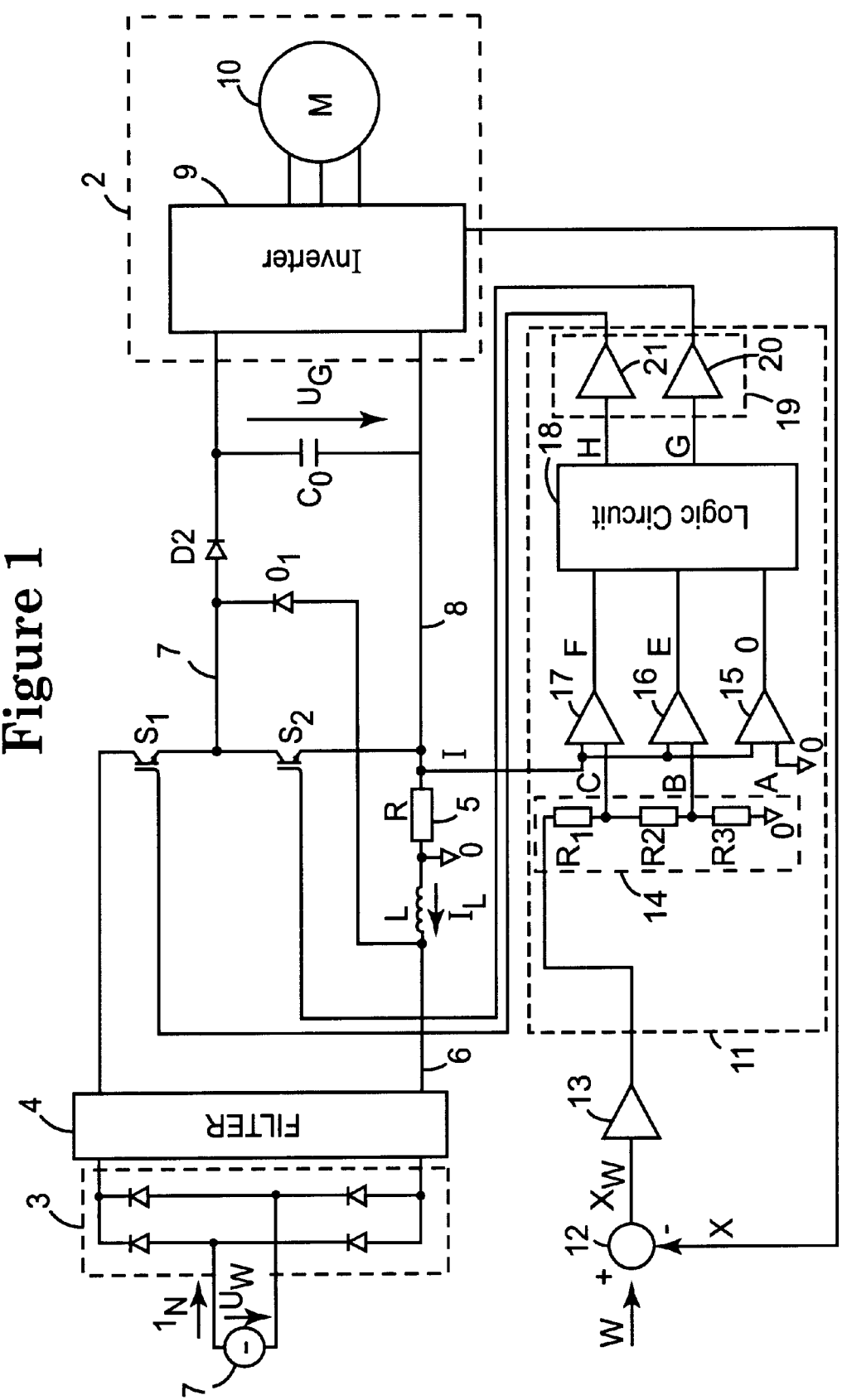
FIG. 1 a simplified block schematic diagram of a circuit device of an embodiment of a power supply device according to the invention FIG. 2 curve diagrams of voltages and currents appearing in the power supply device according to FIG. 1.

The block schematic diagram according to FIG. 1 schematically shows a power supply device for generating a regulated D.C. voltage $U_G$ from an A.C. voltage $U_w$ of an A.C. voltage source 1 for a load 2. On the input side it has a bridge rectifier 3 connected to the A.C. voltage $U_w$, and a filter 4 being arranged at the output of said rectifier. At the output of the filter 4, follow two immediately series-connected switches $S_1$ and $S_2$, here semi-conductor switches, preferably switching transistors, both being made as IGBT and arranged in an integrated circuit module. In series with the switches $S_1$ and $S_2$ is an additional series connection of a current measuring device 5 realised as an ohmic resistor R and an inductor L. Between the connecting line 6 of inductor L and filter 4 and the supply line 7 leading from the connecting point of the two switches $S_1$ and $S_2$ to the load 2 a diode $D_1$ is arranged. After the connecting point of the diode $D_1$ in the supply line 7 there is an additional diode $D_2$, the two diodes $D_1$ and $D_2$ being arranged in series. Between the supply line 7, after the diode $D_2$ and the return line 8 leading from the load 2 to the series connection of current measuring device 5 and inductor L, there is a smoothing capacitor $C_0$, from which the D.C. voltage $U_G$, that is, the output voltage of the power supply device for the load 2, is taken. The load 2 comprises an inverter 9 with the drivers for the control of the valves of the inverter, which valves determine the output voltage frequency of the inverter 9 and thus also the speed of an alternating current motor 10, which is supplied with operating voltage from the inverter. Further, the inverter 9 comprises a measuring device, whose measuring signal X is a measure of the D.C. voltage $U_G$ or the speed of the motor 10, respectively.

The filter 4 substantially permits the rectified sine-shaped half-waves of the output voltage of the rectifier 3 to pass unsmoothed, however, during operation prevents a retroaction of the very much higher switching frequency of the switches $S_1$ and $S_2$ on the alternating current side or on the A.C. voltage source 1, respectively.

Further, the power supply device comprises a control device 11 for the switches $S_1$ and $S_2$. This control device 11 and the components mentioned above constitute part of a regulating circuit for regulating the D.C. voltage $U_G$ Of the load 2 or the speed of the motor 10, respectively. The regulating circuit further comprises an adder 12 and a series-connected amplifier 13, a proportional control amplifier. The adder 12 receives a signal W representing the desired value of the D.C. voltage $U_G$ or the speed of the motor 10, respectively, and, with opposite sign, the measuring signal X representing the actual value of the D.C. voltage $U_G$ or the speed of the motor 10, respectively. Via the amplifier 13, the output signal $X_w$ of the adder 12, the "regulating deviation" or "regulating difference" is led to a voltage divider 14, which consists of a series connection of ohmic resistors $R_1$, $R_2$ and $R_3$. Additionally to the voltage divider 14, the control device 11 comprises three comparators 15, 16, 17, a logic circuit 18, also called boolean matrix, connected with the outputs of the comparators 15 to 17, the outputs of the logic circuit being connected via a driver circuit 19 with the control terminals of the switches $S_1$, $S_2$, the driver circuit 19 having for each switch a driver unit 20, 21, respectively, each comprising a bootstrap capacitor (not shown).

One input of the comparators 15 to 17 receive the measured current signal I of the current measuring device 5. At the other input of the comparator 15, a voltage representing a first limit value A is applied, which is approximately equal to zero, that is, equal to the reference potential. At the other input of the comparator 16, a voltage representing a second limit value B is applied, which is taken from the voltage divider 14. Also at the other input of the comparator 17, there is a voltage taken from the comparator 14, which represents a third limit value C, the second limit value B having a size between that of the first limit value A and the third limit value C.

The limit values A, B, C are proportional to both the output signal $X_w$ of the adder 12 and the measuring signal X. The comparators 15 to 17 generate output signals D, E and F, respectively, that is, binary 1-signals, if the measured current signal I supplied to its one input exceeds the limit value A, B, C, respectively, supplied to its second input, and an inverse signal, if the measured current signal I is lower than the individual limit value. The output signals D, E and F of the comparators 15 to 17 are supplied to the logic circuit 18, which combines these signals in a predetermined way, generating, in dependence of the combination result, switching-on signals G and H at its two outputs, which signals control the switching elements $S_1$ and $S_2$ respectively via the driver units 20, 21.

The following is a detailed description, based on the diagrams shown in FIG. 2, of the mode of operation of the power supply device in FIG. 1.

According to FIG. 2(a), the A.C. voltage $U_w$ is, in the time from $t_0$ to $t_1$, during a step-up conversion mode, lower than the amount of the D.C. voltage $U_G$. During this period, the first switch $S_1$ is on (closed or in the conducting state). As the D.C. voltage $U_G$ during this time is larger than the amount of the A.C. voltage $U_w$, no current is flowing via the switching element $S_1$ through the diode $D_2$ into the smoothing capacitor $C_0$ or the load 2, respectively. Following FIG. 2(b), the switch $S_2$, however, is switched on and off, that is, modulated, at relatively long time intervals, that is, with a relatively low frequency, for as long as the current $I_L$ or the measured current signal I, respectively, is below the limit value B. This means that, when the decreasing measured current signal I reaches the lower limit value A, the switch $S_2$ is switched on. The switch $S_2$, however, is switched off again, when the rising measured current signal I reaches the medium limit value B, so that the current $I_L$ and thus also the measured current signal I drops again. If the amount of the A.C. voltage $U_w$ exceeds the D.C. voltage $U_G$ after the latest switching off of the switch $S_2$ (at the time $t_1$), the measured current signal I starts rising already before reaching the lower limit value A, as at the time $t_1$ the switch $S_1$ is still on. At the time $t_2$, the measured current signal I exceeds the medium limit value B. The measured current signal I subsequently still rising due to the current flow through the turned on switch $S_1$ will then reach the upper limit value C at the time $t_4$. At this instant, the switch $S_1$ is turned off, thus ending the step-up conversion mode, whereas the switch $S_2$ will remain off in the subsequent step-down conversion mode. Now, from the time $t_4$, the measured current signal I drops again, until it reaches the lower limit value A, and is subsequently being turned on and off, periodically or alternatingly, by the switch $S_1$ until the time $t_6$. The switching processes then repeat themselves corresponding to the period from $t_0$ to $t_1$, until the amount of the A.C. voltage $U_w$ exceeds the D.C. voltage $U_G$ again. Subsequently, the switching processes corresponding to the period from $t_1$ to $t_6$ repeat themselves again, and where switching to the step-up conversion mode takes place again at the time $t_6$. Switching from step-up to step-down conversion mode, and vice versa, occurs as a function of the current $I_L$, and thus somewhat delayed in relation to the instants, at which the A.C. voltage $U_w$ exceeds or drops below the D.C. voltage $U_G$.

At zero passage of the A.C. voltage $U_w$, the direction of the input current $I_N$ (the mains current), also shown in FIG. 2(b), reverses, whereas the measured current signal I remains positive.

The times, like $t_4$ and $t_6$, at which switching from the step-up conversion mode to the step-down conversion mode, and vice versa, takes place, are merely determined by means of a monitoring of the current $I_L$. Thus, the A.C. voltage $U_w$ does not have to be measured or known; as mentioned, switching from the step-up conversion mode to the step-down conversion mode takes place, when the current $I_L$ does not reach the first limit value A and then exceeds the second limit value B, and switching from the step-up conversion mode to the step-down conversion mode takes place, when, from the direction of the lower limit value A the current does not reach the medium limit value B, but drops back to the lower limit value A. In practice, this switching takes place, when the switch $S_1$ of the step-down converter receives an on-signal and the current $I_L$ does not increase. This can be determined by means of the output signal D of the comparator 15. The limit values A, B and C have a fixed relation to each other, which is determined by the resistors $R_1$, $R_2$ and $R_3$. The limit value C is always higher than the limit value B. Preferably, the limit values are constant during a period of the A.C. voltage $U_w$. If they should follow the sine-shaped course of the A.C. voltage, it would be possible to increase the power factor additionally, but at the same time the complexity of the circuit would increase.

When the loading caused by the load 2 on the power supply device increases, that is, increasing load current, the maximum value of the current $I_L$ flowing through the inductor L or the current measuring device 5, respectively, increases, whereas the D.C. voltage $U_G$ drops, causing the output signal $X_w$ of the adder 12 and the voltage at the voltage divider 14 to increase. Consequently, also the limit values B and C increase, and the switching frequency of the switches $S_1$, $S_2$, with which they are alternatingly switched on and off, is reduced. A reduction of this switching frequency again means an increase of the D.C. voltage $U_G$, resulting in a compensation of the reduced D.C. voltage $U_G$.

The lower limit value A is always reached, when the inductor L is discharged via the diodes $D_1$, $D_2$, and the smoothing capacitor $C_0$ after switching off switch $S_2$. Compared with the case where the current $I_L$ is not reduced to the lower limit value A or the value zero, respectively, the average value of the current is low, so that when the switch $S_2$ is turned on, the diode $D_2$ is loaded with a lower reverse current during the reverse recovery time. Both things contribute to a reduction of the power loss of the inductor L, meaning that it can be chosen with accordingly smaller dimensions.

If a large current is required, for example, to start a compressor, the lower limit value A can be increased for a short while, whereby the average value of the current $I_L$ increases.

Due to the fact that the switching frequency of the switches $S_1$, $S_2$ depends on the load, the logic circuit 18 of the control device 11 incorporates a switching frequency limiter, which is not shown. The switching frequency limiter prevents that the switching period duration of the switches ($S_1$, $S_2$) drops below a certain minimum by delaying the switching-on time of the switches $S_1$, $S_2$, when a minimum time has not lapsed since the latest switching-on time, and prevents an exceeding of a maximum switching period duration by advancing the switching-on time of the switching elements ($S_1$, $S_2$), when a maximum time has lapsed since the latest switching-on time. This involves the advantage that a too large deterioration of the efficiency of the power supply device is prevented in case of partial load.

What is claimed is:

1. Method for generating a regulated D.C. voltage ($U_G$) from an A.C. voltage ($U_w$) by means of a power supply device, comprising a step-down converter ($S_1$, $D_1$, $D_2$, $C_0$, L) with a first switch ($S_1$), a step-up converter ($S_2$, $D_2$, $C_0$, L) with a second switch ($S_2$), an inductor (L), which is common for both converters, and a control device (11), which sequentially controls the step-down converter and the step-up converter in such a way, that the power supply device is operated in either a step-down conversion mode or a step-up conversion mode, wherein a measured current signal (I) of the current ($I_L$) flowing through the inductor (L) is compared with a first limit value (A), a second limit value (B) and a third limit value (C), the first limit value (A) being close to zero and the second limit value (B) ranging between the first limit value (A) and the third limit value (C), and at least the second and the third limit values (B, C) being inversely proportional to the actual value (X) of a physical magnitude corresponding to the D.C. voltage ($U_G$), the control device (11) switches the power supply device from the step-up conversion mode to the step-down conversion mode, when, after reaching the second limit value (B), the rising measured current signal (I) starts decreasing, though not reaching the first limit value (A), but rises ($t_4$) to the third limit value (C), and the control device (11) of the power supply device switches from the step-down conversion mode to the step-up conversion mode, when the decreasing measured current signal, after reaching the first limit value (A), starts rising and does not reach the second limit value (B), but decreases back ($t_6$) to the first limit value (A).

2. Method according to claim 1, wherein in the step-up conversion mode ($t_0$ to $t_1$) the first switch ($S_1$) is on and during this mode the second switch ($S_2$) is turned off, when the rising measured current signal (I) reaches the second limit value (B), and is turned on when the decreasing measured current signal (I) reaches the first limit value (A), and that in the step-down conversion mode ($t_1$ to $t_5$) the second switch ($S_2$) is off and during this mode the first switch ($S_1$) is turned on, when the decreasing measured current signal (I) reaches the first limit value (A), and is turned off, when the rising measured current signal (I) reaches the third limit value (C).

3. Power supply device for implementing the method according to claim 1 for a load (2), with a rectifier (3), on whose output side the first switch ($S_1$) and the inductor (L) are arranged in series, with a first diode ($D_1$), which forms a current circuit with the second switch ($S_2$), a second diode ($D_2$), a smoothing capacitor ($C_0$), into which the inductor is dischargeable through the two diodes ($D_1$, $D_2$), when the switches ($S_1$, $S_2$) are off (opened), and with a control device, which has an adder (12) for desired and actual values of the signals (W, X) having opposite signs and representing the D.C. voltage ($U_G$) and the control device (11) for the switches ($S_1$, $S_2$), wherein the control device (11) has three comparators (15, 16, 17), each comparing one of the limit values (A, B, C) with the measured current signal (I) of a current measuring device (5) arranged in series with the inductor (L) and that at least the second and the third limit values (B, C) are dependent upon the output signal ($X_w$) of the adder (12).

4. Power supply device according to claim 3, wherein the second and the third limit values (B, C) are directly proportional with the output signal ($X_w$) of the adder (12).

5. Power supply device according to claim 4, wherein the limit values (A, B, C) are supplied from a voltage divider (14), which is connected with the output of the adder (12) via an amplifier (13).

6. Power supply device according claims 5, wherein the switches ($S_1$, $S_2$) are connected directly in series.

7. Power supply device according to claim 6, wherein the control device (11) comprises a switching frequency limiter, which prevents that the switching period duration of the switches ($S_1$, $S_2$) drops below a certain minimum by delaying the switching-on time of the switches S, $S_2$, when a minimum time has not lapsed since the latest switching-on time, and prevents an exceeding of a maximum switching period duration by advancing the switching-on time of the switching elements ($S_1$, $S_2$), when a maximum time has lapsed since the latest switching-on time.

* * * * *